United States Patent [19]
Zetena, Jr.

[11] Patent Number: 4,860,343
[45] Date of Patent: * Aug. 22, 1989

[54] COMPOSITE CABLE FOR USE IN HIGH FREQUENCY DATA AND VOICE TRANSMISSION

[76] Inventor: Maurice F. Zetena, Jr., P.O. Box 59, Bridgewater, Conn. 06752

[*] Notice: The portion of the term of this patent subsequent to Aug. 2, 2005 has been disclaimed.

[21] Appl. No.: 190,361

[22] Filed: May 5, 1988

Related U.S. Application Data

[63] Continuation of Ser. No. 944,827, Dec. 22, 1986, Pat. No. 4,761,811.

[51] Int. Cl.⁴ .......................................... H01B 11/02
[52] U.S. Cl. .................................. 379/110; 379/397; 174/34
[58] Field of Search ................. 379/397, 326, 90, 110; 174/103, 115, 32, 34, 36

[56] References Cited

U.S. PATENT DOCUMENTS

| | | | |
|---|---|---|---|
| 3,747,067 | 7/1973 | Fox et al. | 340/825.58 |
| 3,936,602 | 2/1976 | Korver | 375/36 |
| 4,056,790 | 11/1977 | Pospischil et al. | 379/417 |
| 4,096,346 | 6/1978 | Stine et al. | 174/36 |
| 4,512,025 | 4/1985 | Frankel et al. | 375/36 |
| 4,595,799 | 6/1986 | Krob et al. | 379/397 |
| 4,755,629 | 7/1988 | Beggs et al. | 174/36 X |
| 4,761,811 | 8/1988 | Zetena, Jr. | 379/326 |

FOREIGN PATENT DOCUMENTS 2049365 12/1980 United Kingdom .................. 375/36

OTHER PUBLICATIONS

William Ross, "Making the Data Connection with Twisted-Pair Cable", Telecommunications, Sep. 1986, pp. 154-160.

*Primary Examiner*—James L. Dwyer
*Attorney, Agent, or Firm*—Haynes N. Johnson

[57] ABSTRACT

A networking system to interconnect computer terminals with a host computer, the system being capable of carrying data bits at high frequencies and being capable of readily having its interconnection pattern changed. The system includes a plurality of composite cables for transmission of the data bits, one such cable for each such computer terminal, each of the cables including at least two sets of twisted pair data lines and an associated drain line, each set of data lines being within a shielding sleeve, and said sleeves being isolated from one another. A distribution wiring board for interconnecting the cables with the host computer, the wiring board including a punch down block with multiple sets of aligned punch-down connectors for connecting the wires in the sets and the drain wires to the wiring board, means for grounding the drain wires, and a data board for changing the local area network formed by the cables and the computer terminals. The composite cables also includes telephone wires for providing telephone service at the computer terminals.

5 Claims, 5 Drawing Sheets

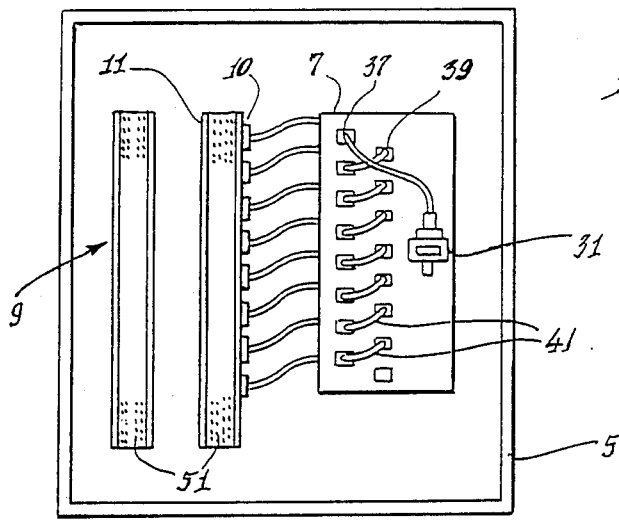
Fig. 4.
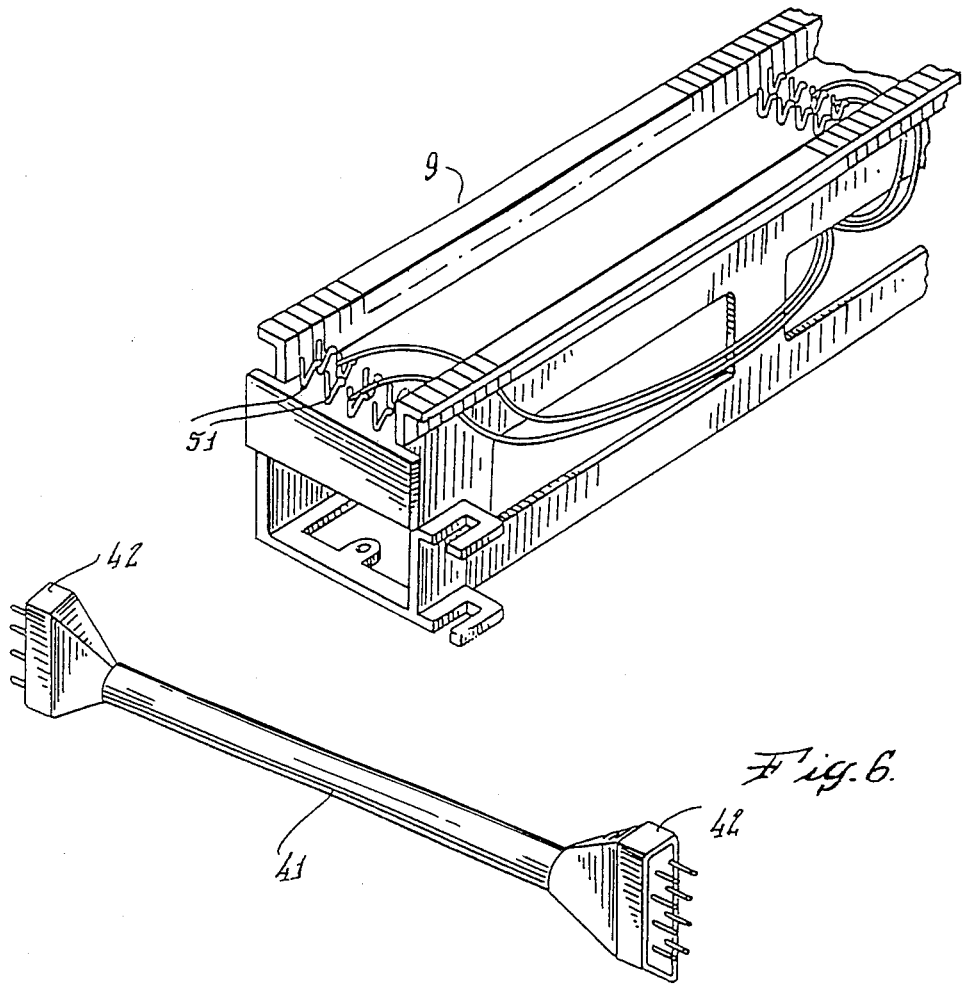
Fig. 5.
Fig. 6.

COMPOSITE CABLE FOR USE IN HIGH FREQUENCY DATA AND VOICE TRANSMISSION

This is a continuation of co-pending application Ser. No. 944,827, filed on Dec. 22, 1986, now U.S. Pat. No. 4,761,811.

FIELD OF THE INVENTION

This invention relates to transmission systems which interconnect host computers or controllers with a plurality of terminals and in which the nature of the interconnections can be changed in a wiring board positioned between the computer and the terminals. It also provides for simultaneous voice transmission.

Even though the data is transmitted at high frequencies, of the order of 13 to 16 megahertz, the use of coaxial or twinaxial cable is obviated, the signal to noise ratio is low, and connections can be readily made using a punch down block.

BRIEF SUMMARY OF THE INVENTION

Many offices have a number of computer terminals interconnected to a host computer or controller and to one another through some form of local area network. Complementary parallel telephone lines are usually also included with the wiring system. In such networks it is valuable to be able to change the interconnections within the system readily, and, of course, important to be able to wire the system initially, at minimum cost.

Due to the high frequencies utilized in digital transmissions within the network, coaxial or twinaxial cable has often been used in these systems. Alternatively, twisted pairs may be used if encased within a braided shield. Connection of either of these to a wiring board is difficult and expensive, since coaxial cables require use of expensive and bulky connectors and the connection of braided cable to a punch down block requires the use of a ferrule and pigtail, at added cost.

The system of the present invention permits ready use of a punch down block in connection with a shielded cable, through use of a unique composite cable. One cable is used for each computer terminal, and it includes two pairs of telephone lines and two twisted pairs of computer data lines, each of the latter having an associated grounded drain wire. Each twisted pair is shielded and has a drainwire; and the entire cable structure is contained within an outer casing.

The composite cable is readily connected at one end to a punch down block, and, at the other, to a computer terminal and associated telephone. The two sets of twisted pairs permit simultaneous transmission in both directions.

The wiring board is used to interconnect the host computer with the various computer terminals. It includes a "send" electrical terminal and a "receive" electrical terminal for each composite cable and a series of jumpers, so that the wiring layout can be readily changed.

DESCRIPTION OF THE DRAWINGS

Turning to the drawings:

FIG. 4 is an elevation of the interior of the wiring board.

FIG. 5 is a perspective view of a punch down block of the type which would be used in the wiring board to interconnect the incoming composite cable with the circuitry of the data board.

FIG. 6 is a perspective view of a jumper cable.

DETAILED DESCRIPTION OF THE INVENTION

The transmission system of my invention is used to receive the input from a host computer or controller and to interconnect it to a plurality of computer terminals.

The System Layout

Figure 1:
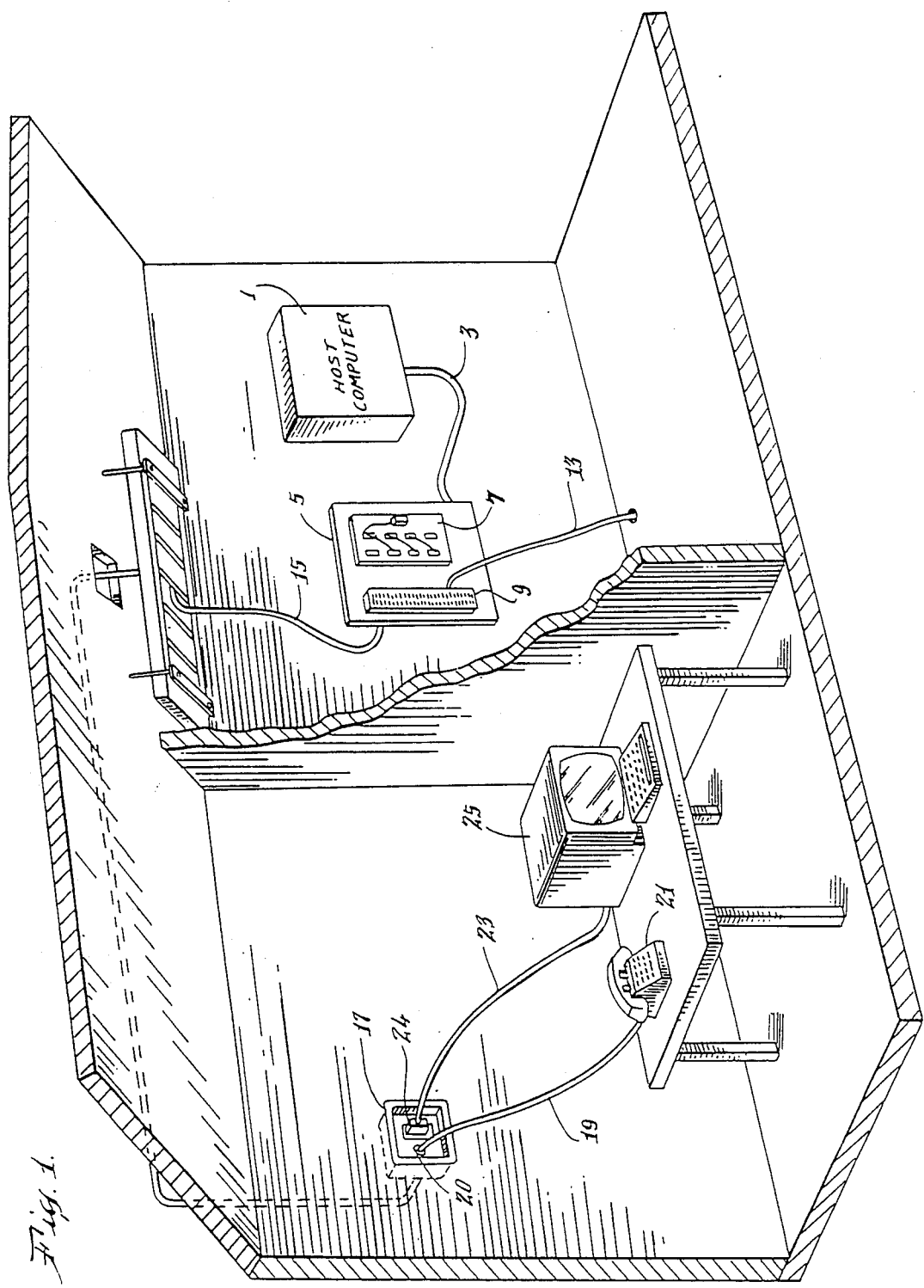
FIG. 1 is a generalized perspective view of the transmission system of my invention showing the host computer or controller, connected to the wiring board and wiring from voice riser and showing my composite cables running from this wiring board to the various computer terminals and associated telephones. The wiring closet includes a data board and a punch down block.

FIG. 1 provides a generalized view of the system layout. Block 1 represents the host computer or controller. Lead 3 runs from it to wiring board 5, which includes data board 7 and punch down block 9. A telephone riser 13, with the necessary telephone lines, leads to wiring board 5 and is connected to punch down block 9. A plurality of composite cables 15, only one of which is shown, are also connected to wiring board 5 through punch down block 9. They then run through the interior building walls; and there is a separate composite cable running from the wiring board to each computer terminal.

A single terminal connection is represented by wall plate 17 and its associated wiring. The telephone lead 19 is connected to the composite cable 15 through plug 20 in plate 17, and then runs to telephone 21. Another lead 23 runs from plug 24 at plate 17 to computer terminal 25.

As will be further described below, composite cable 15 includes two twisted pairs of wires for the terminal, one for incoming signals to computer terminal 25, and the other for signals leaving the computer terminal. This permits the terminal to be part of a local area network. The cable usually also includes telephone wires to carry telephone communications.

The Composite Cable

Figure 7:
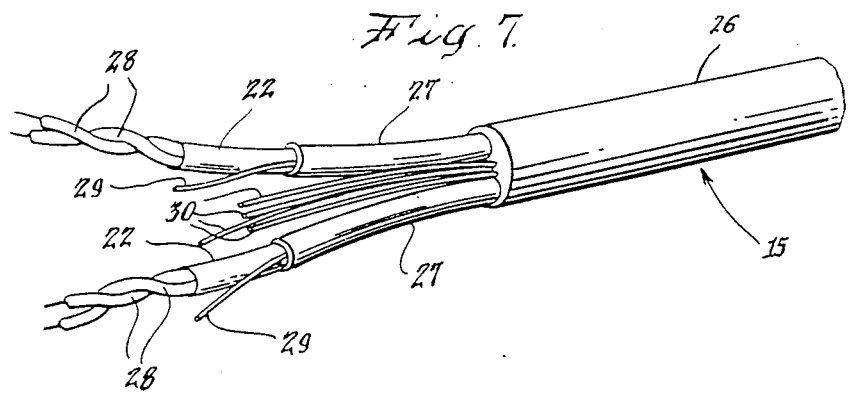
FIG. 7 is a perspective view of the composite cable of my invention.

The composite cable 15 used to connect the terminals 25 with wiring board 5 is shown in FIG. 7. It is formed of two sets of twisted pairs 28 and associated drain wires 29 in conductive shielding 22, together with one or two pairs of telephone wires 30, all of which are carried within outer casing 26. Drain wire 29 is in contact with shielding 22 (preferably outside shielding 22) in each set and is returned to earth ground.

The use of the drain wires 29 makes it far simpler to ground the shielding and to provide a common return path than the use of prior art braid, yet serves a function to simplify common system shielding more readily than that of a braided shield. The drain wire 29 reduces cost since it permits the use of a punch down block 9; this avoids having to use the pigtail and ferrule required with metallic braid.

The sets of twisted pairs 28, drain wires 29, and shielding 22 are electrically isolated from one another by insulating protective sleeves 27 (preferably made of Mylar) surrounding each shield 22 and drain wire 29. This construction prevents the development of ground currents between the sets and provides 65 dB separation at 5 megahertz.

The capacitance of the composite cable 15 may be held low by having adequate insulation (increased spacing and adequate dielectric constant) on the wires of each twisted pair 28. I have found that a cable will perform satisfactorily if it has a capacitance of no greater than about 8.0 picofarads/foot between the wires of a twisted pair, with an attenuation of no more than about 12 dB/1000 feet at 13 megahertz and about 6.63 to 7.3 dB/1000 feet at 4 megahertz.

The cable should have a controlled nominal impedance of about 145 ohms at 10 megahertz.

EM1 (Electro magnetic interference) and RF1 (radio frequency interference) industry specifications covering shielded low capacity cables "good practices" have been included in the design.

In this way I have made composite cables, such as cable 15, that are capable of carrying frequencies of up to 16 megahertz over long distances without an undesirable amount of attenuation, and I believe that this type of design can be used to further enhance this capability.

The Data Board

Figure 2:
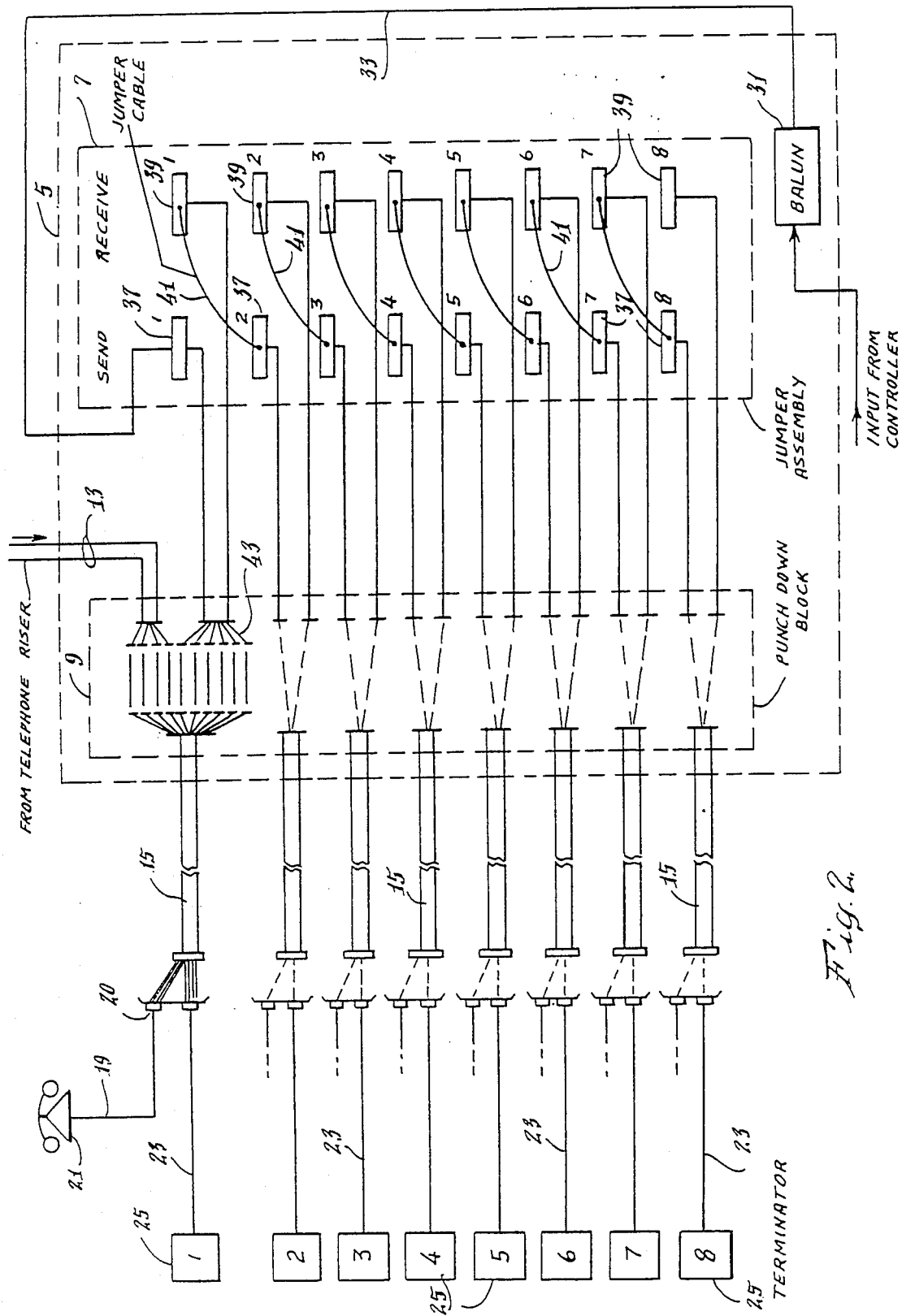
FIG. 2 is a partial circuit diagram. It shows the controller leads entering the wiring board and its signals being routed through the data board to the various composite cables leading to the terminals and telephones.
Figure 3:
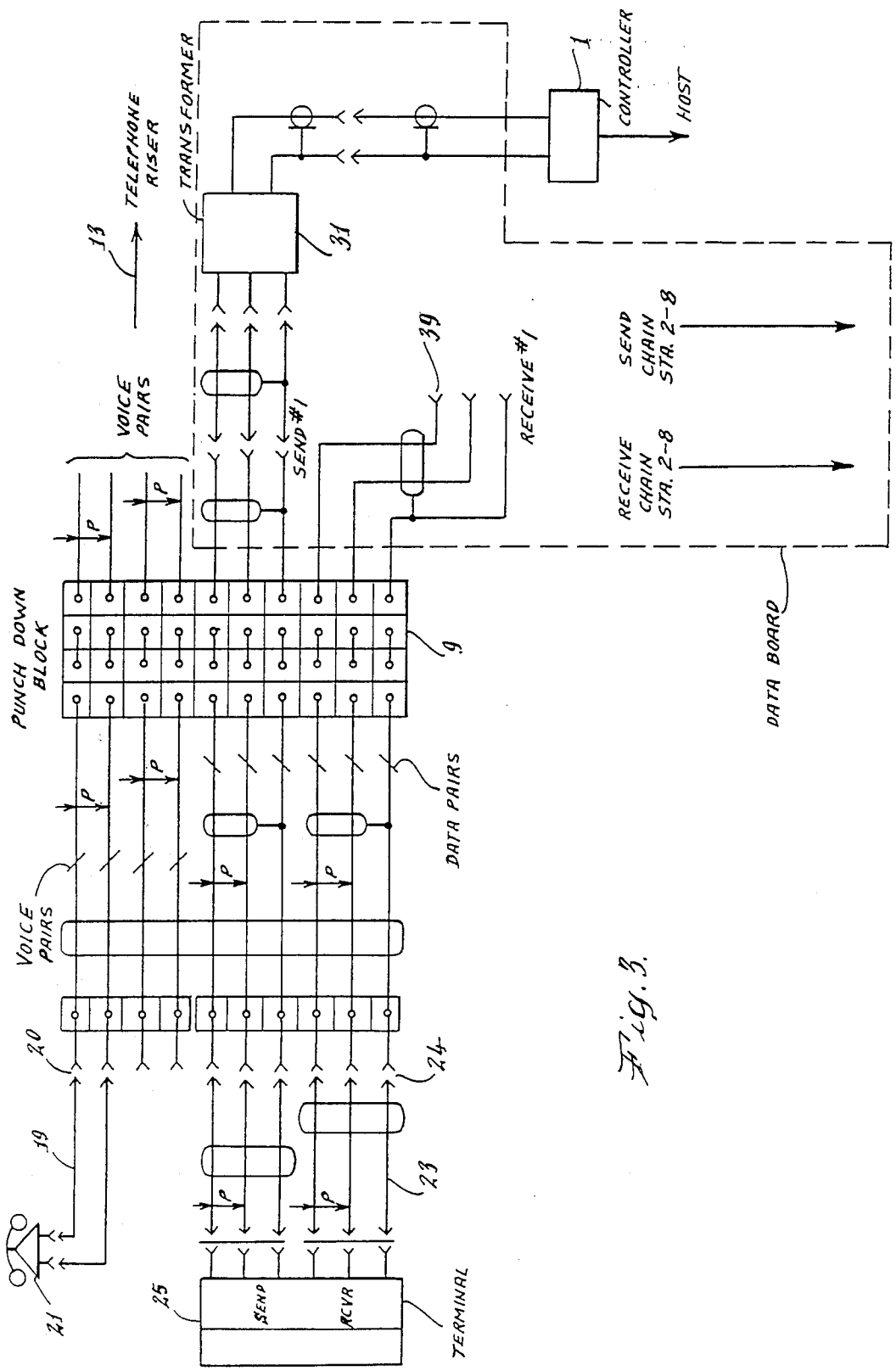
FIG. 3 is a more detailed circuit diagram, showing the circuitry associated with a given terminal.

The heart of the circuitry, shown in FIGS. 2, 3 and 5, is wiring board 5 in association with the composite cable 15. The wiring board includes interconnected data board 7, associated punch down block 9, and balun (transformer) 31.

Data board 7 includes a plurality of "send" connecting terminals 37, normally DB9 plugs, and an equal number of similar associated "receive" electrical terminals 39. (There should be a pair of "send" and "receive" terminals for each computer terminal 25 that is to be accommodated.)

One side 10 of the punch down block 9 is wired to the terminals 37 and 39. The other side 11 is connected to the composite cables 15, there being one such cable for each terminal. Each "send" terminal 37 is associated with, and wired to, one of the computer terminals 25 through one of the two pairs of twisted wires 28 and the associated drain wire 29 in one composite cable 15; the "receive" terminal 39 is wired similarly to the "send" terminal 37 for that terminal in the same cable. Thus, each computer terminal 25 has an associated "send" and "receive" terminal in the data board.

In order to connect each composite cable 15 to its respective pair of electrical terminals 37 and 39 in the data board, a punch down block 9 (FIG. 5) is included with the wiring board 5. This punch down block may be of the standard type which has long been used for telephone interconnections. It includes the usual sets of transversely connected splicing posts 51, i.e., slotted metallic posts for receiving and holding wires such as telephone wires. Here, however, it is used to receive the twisted pairs 28 and drain wires 29 from composite cable 15, each of which may be readily received and held by splicing posts 51. It is also used to connect the telephone line from riser 13 to the telephone lines 30 in the composite cable.

As can be seen, the use of composite cable 15, having drain wires instead of braiding, permits the use of a punch down block, such as block 9, since one cannot punch down braiding in a punch down block.

The two pairs of twisted wires 28 and drain wires 29 in each composite cable 15 are connected to the punch down block posts 51 and, through their associated posts, are connected to the electrical terminals, one set to the "send" terminal 37, and the other to the "receive" terminal 39. The drain wire connections to the punch down block are also grounded, normally through a common ground wired at the data board.

Figure 8:
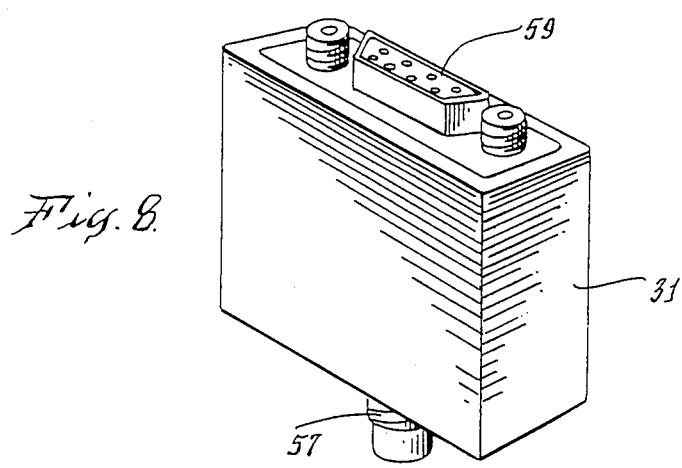
FIG. 8 is a perspective view of a typical balun (transformer) such as might be used at the wiring board input for impedance matching of the lead from the host computer.

Wiring board 5 also includes balun 31 (FIG. 8). A balun is a matching transformer used to interconnect signals from the host computer 1 with the data board. It includes an input connector 57, such as a coaxial connector, and an output connector 59. The latter is normally connected to the "send" terminal 37 of the data board 7, to provide interconnection with the host computer.

Figure 9:
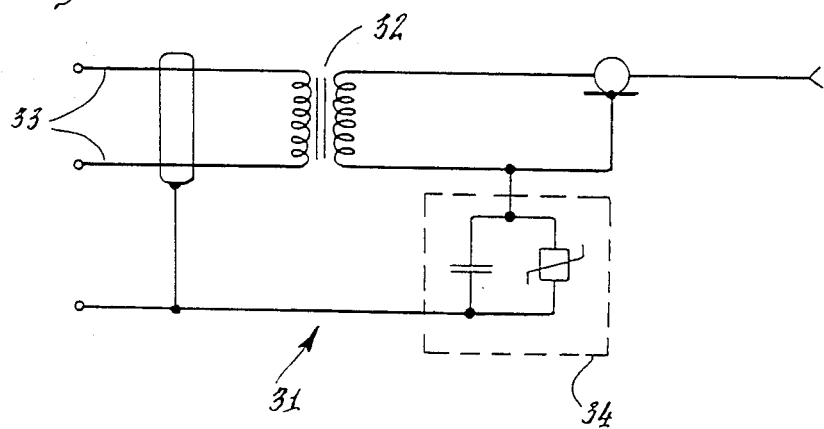
FIG. 9 is a balun circuit diagram.

FIG. 9 shows a typical circuit for a balun. It includes isolation transformer 32 (with impedance matching) to pass the signal on input 57 from the host computer or controller and with output 59, and a spurious signal suppressor 34.

A series of jumper cables 41 with electrical connectors 42 on each end, such as are shown in FIG. 6, are used to establish the circuit from the input transformer to and through the terminals. The jumper cables are similar to the composite cables and include twisted pairs, drain wires, and shielding, so that a continuous shield is provided for the system. Preferably, a common ground for the system is located under the data board, and all drain wires in the system use this common ground.

A typical circuit arrangement for data board 7 would be to have the signal from the controller pass to each of the terminals in sequence. This would be done by feeding the input on line 33 (FIG. 2) through the "send" terminal of computer terminal 1, receive it back on the "receive" terminal of computer terminal 1, jump it to the "send" terminal of computer terminal 2, receive it back on the "receive" terminal of computer terminal 2, jump it to the "send" terminal of computer terminal 3, and so on until it has passed to and returned from as many terminals as desired. After the last terminal, it is then resistively terminated.

As can be seen, any type of local area network, utilizing any number of terminals, such as a "star" network or a token ring, may be set up simply by repositioning the jumpers.

Thus, I have provided a plurality of sets of associated composites cables, each connected to its respective electrical terminals 37 and 39. There can be as many of these sets as desired on a given wiring board, but there must be at least one for each terminal to be used. The interconnections may be readily changed by varying the electrical terminals to which the jumper cables are connected.

The Circuitry

The lead 3 from the host computer 1, often a coaxial or twin axial cable, enters transformer 31, for matching, and then goes to data board 7 via lead 33 (FIG. 2) (a twisted pair and drain). The signal then passes through the punch down block 9 and enters on twisted pair in a composite cable 15. This leads to the first computer terminal 25. It returns in the other twisted pair of the composite cable to the "receive" terminal 39 for the first computer terminal. The jumper 41 connected to that "receive" terminal determines future routing. It can, for example, pass to the "send" terminal 37 for the second terminal 25. If so, the signal will then go to that terminal through a twisted pair of a different composite cable 15 and return to the "receive" terminal 39 for the second computer terminal through the other twisted pair of the same composite cable. This will continue until the end of whatever pattern of jumper cables and computer terminals has been set up. In each instance it is possible to have complementary telephone service to the region of each computer terminal by use of the telephone lines in the composite cables.

Thus, a data and voice transmission system has been created which is easy and inexpensive to set up and which can be readily varied.

I claim:

1. A low capacity, controlled impedance cable for use in a long distance networking system for interconnecting a plurality of computer terminals with a host computer or controller, said cable including a plurality of sets of twisted pairs, said sets including at least one set of data pairs, each said set of data pairs being encased in a conductive shielding to form a shielded unit, a drain wire associated with each said set of data pairs and held in contact with said conductive shielding for its respective said set, and said shielded units being isolated from one another, the wires in said twisted pair for data transmission having sufficiently thick insulation about them to provide for such spacing therebetween that the capacity is no greater than about 8.0 picofarads/foot dielectric constant, said shielded units being encased within an outer casing.

2. A composite cable as set forth in claim 1 including insulating protective sleeves surrounding each said shielded unit to provide said electrical isolation, said sleeves holding each said drain wire against its respective said conductive shielding.

3. A composite cable as set forth in claim 1 in which the attenuation in said twisted pairs is no more than about 12 dB/1000 feet at 13 megahertz and no more than about 7.3 dB/1000 feet at 4 megahertz.

4. A composite cable as set forth in claim 1 including at least one pair of telephone wires within said outer casing.

5. A low capacity, controlled impedance cable for use in a long distance networking system for interconnecting a plurality of computer terminals with a host computer or controller, said cable including a plurality of sets of twisted pairs, at least one of said sets being for data transmission and at least another of said sets being for telephone transmission, each said set of data pairs being encased in a conductive shielding to form a shielded unit, a drain wire associated with each said set and held in contact with said conductive shielding for its respective said set, and said shielded units being isolated from one another, the wires in said twisted pair for data transmission having insulation about them to provide for spacing therebetween, the capacity of each of said data pairs being no greater than about 8.0 picofarads/foot dielectric constant, said shielded units being encased within an outer casing.

* * * * *